(12) United States Patent
Nakajima et al.

(10) Patent No.: US 6,949,286 B2
(45) Date of Patent: Sep. 27, 2005

(54) RADIATION-ABSORBING LAYERS FOR THERMOPILE RADIATION DETECTORS

(75) Inventors: Yasushi Nakajima, Kanagawa (JP); Masaki Hirota, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 248 days.

(21) Appl. No.: 10/245,687

(22) Filed: Sep. 18, 2002

(65) Prior Publication Data

US 2003/0054179 A1 Mar. 20, 2003

(30) Foreign Application Priority Data

Sep. 20, 2001 (JP) ........................................ 2001-286477

(51) Int. Cl.[7] .............................. B32B 5/16; G01J 5/12; G01K 7/00

(52) U.S. Cl. ....................... 428/331; 428/323; 428/328; 250/338.4; 374/121; 374/179

(58) Field of Search .................................. 428/323, 328, 428/331, 447, 429; 250/338.4, 339.01, 339.02, 338.1; 356/432, 234; 374/121, 130, 131, 179; 136/213

(56) References Cited

U.S. PATENT DOCUMENTS

| | | | |
|---|---|---|---|
| 3,405,271 A | | 10/1968 | Stevens et al. |
| 3,405,272 A | | 10/1968 | Stevens et al. |
| 4,111,717 A | * | 9/1978 | Baxter .......................... 136/214 |
| 4,282,290 A | | 8/1981 | Pellicori et al. |
| 5,316,854 A | * | 5/1994 | Lin et al. ...................... 428/426 |
| 5,412,279 A | * | 5/1995 | De Boer ....................... 313/479 |
| 5,545,897 A | * | 8/1996 | Jack ......................... 250/339.13 |
| 5,689,087 A | | 11/1997 | Jack |
| 5,982,014 A | * | 11/1999 | Paige .......................... 257/467 |
| 6,060,151 A | * | 5/2000 | Shiraishi et al. ............. 428/209 |
| 6,222,111 B1 | * | 4/2001 | Kern .......................... 136/201 |
| 6,368,400 B1 | | 4/2002 | Baldwin et al. |
| 2002/0018887 A1 | * | 2/2002 | Sumida et al. .............. 428/331 |
| 2002/0025425 A1 | * | 2/2002 | Kawazu ...................... 428/323 |
| 2002/0162585 A1 | * | 11/2002 | Sugawara et al. .......... 136/250 |

* cited by examiner

*Primary Examiner*—Jennifer McNeil
*Assistant Examiner*—G. Blackwell-Rudasill
(74) *Attorney, Agent, or Firm*—McDermott Will & Emery LLP

(57) ABSTRACT

A radiation-absorbing layer for a thermopile radiation detector highly absorbs incident radiation within a predetermined band of wavelengths. The layer comprises a solid construction of a mixture of an oxide of silicon and separate and/or linked particles of at least one material selected for absorbing incident radiation within the predetermined band.

21 Claims, 9 Drawing Sheets

RADIATION-ABSORBING LAYERS FOR THERMOPILE RADIATION DETECTORS

BACKGROUND OF THE INVENTION

1. Field of the Invention

The present invention relates generally to radiation-absorbing layers for thermopile radiation detectors and methods for fabricating thermopile radiation detectors.

2. Description of the Background Art

A thermopile includes a plurality of thermocouples that are connected in series. Each thermocouple relies on the generation of the well-known Thompson and Peltier emfs that result from a temperature gradient across a junction between two dissimilar metals. A combination of the Thompson and Peltier effects produces the Seebeck emf, which is used in thermocouples.

In general, a thermopile radiation detector has a first set of junctions (hot junctions) that make good thermal contact with a radiation receiver (e.g., a black body) but which are electrically insulated from the radiation receiver. A second set of junctions (cold junctions) is attached to a support, which does not receive the radiation and which is therefore at a lower temperature. The incident radiation raises the temperature of the radiation receiver and produces a voltage output from the thermopile that is proportional to the energy absorbed. That is, the thermopile output voltage is proportional to a temperature difference and is, therefore, proportional to the total radiation energy received.

Thermopile infrared detectors are known, which have been constructed on electrically insulating thermally conducting membranes. This approach generally increases the electrical response of the thermopile. However, the increase in electrical response is made at the expense of special and complex "Back-end" processes such as backside etching with anisotropic etches.

Reference can be made to U.S. Pat. No. 3,405,271 (issued Oct. 8, 1968) entitled "Detector Having Radiation Collector Supported on Electrically Insulating Thermally Conducting Film" by N. B. Stevens et al., and also to U.S. Pat. No. 3,405,272 (issued Oct. 8, 1968) entitled "Film Supported Detector with Low Heat Transfer Impedance Path from Cold Junctions to Thermal Sink" by N. B. Stevens et al. In both of these U.S. patents, an aluminum oxide is disposed over surfaces of a cold sink and spans a cavity within the cold sink. The aluminum oxide film supports two thermoelectric materials (Bi and Sb).

A radiation-absorbing layer of blackening material is positioned locally within a small region that includes a thermocouple junction. The blackening material, such as gold (Au) black or bismuth (Bi) black, is evaporated on to the small region. In U.S. Pat. No. 3,405,272, a porous layer of bismuth (Bi) material is positioned over the surface of each collector. The blackening material renders the surface absorptive, thus increasing the electrical response (in volts output per watt of radiation received) of the thermopile.

As a radiation-absorbing layer for a thermopile infrared detector, gold (Au) is evaporated to grow dendrites on the thermocouple surface. A suggested method of growing dendrites of gold (Au) is to position the thermopile within a vacuum chamber so that it may be physically moved from the outside of the chamber. The majority of air is evacuated from the vacuum chamber down to a predetermined pressure. Subsequently, inertia gas is fed at a predetermined pressure to fill the vacuum chamber, keeping the system pressure within the chamber constant at a vacuum level falling in a range over several hundreds Pa. At such vacuum level, the mean free path within the vacuum chamber is extremely short. Gold material is positioned in an evaporation port directly below the thermocouple surface. The gold is heated and a gold smoke is produced which rises and engages the surface. Strict control of the evaporation rate is needed to allow dendrites to grow on the thermocouple surface.

The radiation-absorbing layer of dendrites of gold exhibits a high degree of absorptance exceeding 90%. However, one drawback to the use of dendrites of gold (Au) in thermopile detectors is a lack of a suitable patterning process that is compatible with standard integrated circuit processing techniques. Besides, the dendrites, which are unsuitable for conventional etching, require special care in a patterning process to remove unnecessary portions leaving the thermocouple surface.

As a radiation-absorbing layer for a thermopile infrared detector, a non-porous multi-layered construction is provided, which achieves a high degree of absorption by trapping radiation within a resonant cavity. This multi-layered radiation-absorbing layer can be formed by the standard integrated circuit processing techniques. However, one disadvantage of this conventional multi-layered construction is that its absorptance is about 70% and subject to variations with different wavelengths of the incident radiation. Total energy absorbed is therefore small. The use of this conventional approach is limited to the case where the electrical response (in volts output per watt of radiation received) of thermopile detectors is high.

An object of the present invention is to provide radiation-absorbing layers for thermopile radiation detectors, and methods for fabricating thermopile radiation detectors, that overcome the foregoing and other problems.

Another object of the present invention is a radiation-absorbing layer that is formed using conventional semiconductor processing techniques including photolithography and etching.

Another object of the present invention is to provide a radiation-absorbing layer that highly absorbs electromagnetic radiation within a desired band of wavelengths.

A further object of the present invention is to provide a radiation-absorbing layer that selectively absorbs electromagnetic radiation within an infrared band of wavelengths.

A still further object of the present invention is to provide a radiation-absorbing layer that absorbs electromagnetic radiation within a predetermined band of wavelengths and reflects electromagnetic radiation outside of the predetermined band of wavelengths.

SUMMARY OF THE INVENTION

According to one aspect of the present invention, there is provided a radiation-absorbing layer for a thermopile radiation detector that is responsive to incident radiation having wavelengths of interest, the radiation-absorbing layer comprising:

a solid construction of a mixture of an oxide of silicon and separate and/or linked particles of at least one material selected for absorbing incident radiation over the wavelengths of interest.

According to another aspect of the present invention, there is provided a radiation-absorbing layer for a thermopile radiation detector that is responsive to incident radiation having wavelengths of interest, the radiation-absorbing layer comprising:

a solid construction of a mixture of an oxide of silicon and separate and/or linked particles of at least one material selected for absorbing incident radiation within a predetermined band of wavelengths and for reflecting incident radiation outside of the predetermined band of wavelengths.

BRIEF DESCRIPTION OF THE DRAWINGS

Further objects and advantages of the invention will be apparent from reading of the following description in conjunction with the accompanying drawings.

DETAILED DESCRIPTION OF THE INVENTION

Figure 1:
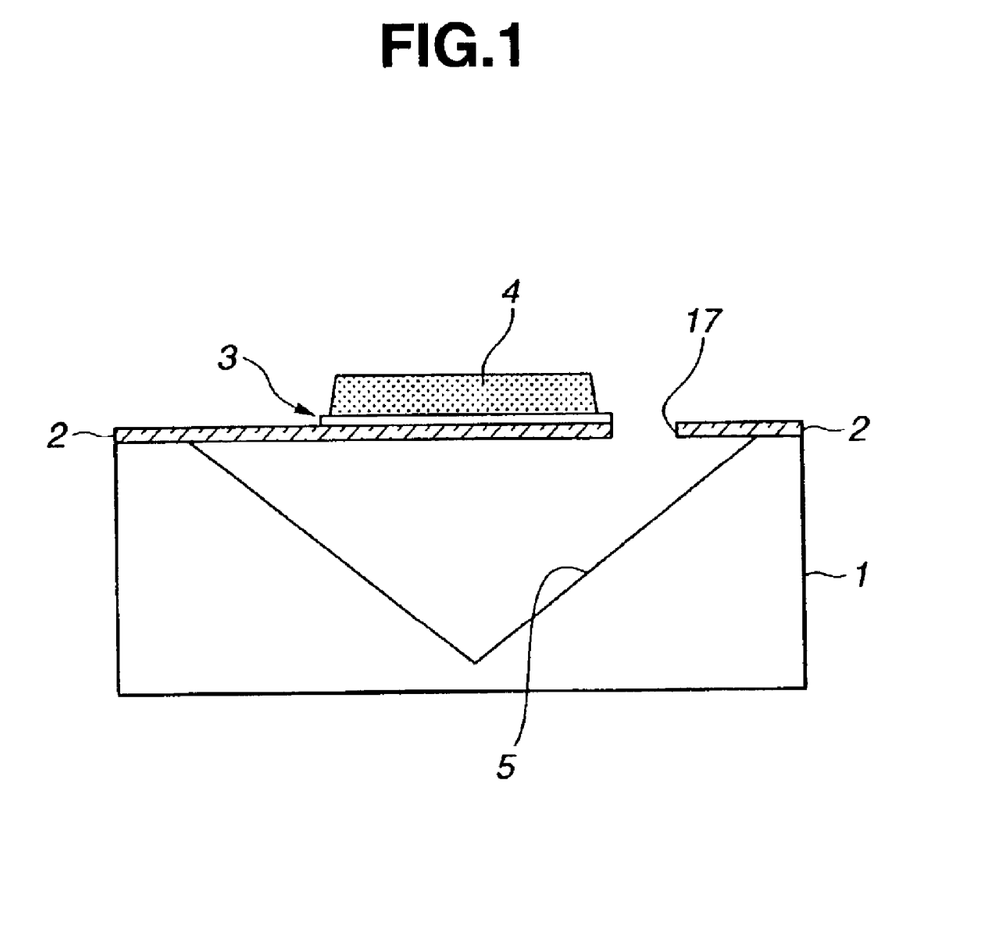
FIG. 1 is a schematic cross sectional view in simplified and exaggerated form of a radiation-absorbing layer according to the present invention applied to a thermocouple of a thermopile radiation detector.

FIG. 1 is a schematic cross sectional view of a thermopile radiation detector incorporating a first exemplary embodiment of a radiation-absorbing layer 4 in accordance with the teaching of the invention.

In general, the thermopile radiation detector is responsive to incident electromagnetic radiation having wavelengths of interest. In the embodiment, the thermopile detector is a thermopile infrared detector that is tuned to an infrared band of wavelengths.

The thermopile detector includes a semiconductor substrate 1 having a cavity 5 formed beneath a thermocouple 3 backed by a membrane film 2. The film 2 is formed with a process aperture 17 as entrance for etchant used to make the cavity 5. Overlying the top of the thermocouple 3 is the radiation-absorbing layer 4.

The radiation-absorbing layer 4 includes a solid construction of a mixture of an oxide of silicon and particles. The particles include separate particles and/or linked particles of at least one material selected for absorbing incident radiation over wavelengths of interest.

In the embodiment, the solid construction includes a film of silicon dioxide ($SiO_2$) as a carrier for the particles of material selected for absorbing the incident radiation. The film of silicon dioxide has a refractive index (n) of about 1.3. Assuming that there is no absorption, a reflectance R at a surface of the film of silicon dioxide may be expressed as:

$$R=[(n-1)/(n+1)]^2 \quad (1).$$

Putting n=1.3 into the equation (1), we obtain that R is about 0.017. Thus, the reflectance R may be expressed as 1.7%. This clearly indicates that almost all of incident radiation enters the film of silicon dioxide. In the embodiment, gold (Au), which is considered as a stable metal element, is used as a material of the particles incorporated in the film of silicon dioxide. The film of silicon dioxide is derived from a spin-on-glass (SOG) that is in a liquid state. The SOG used in embodiments was provided by and manufactured at Tokyo Ohka Kogyo Co., Ltd., Kanagawa, Japan. The SOG, which does not contain any phosphoric component, such as phosphoric anhydride ($P_2O_5$), was used, for a reason that will be explained later in connection with FIGS. 3(F) and 3(G).

Figure 2:
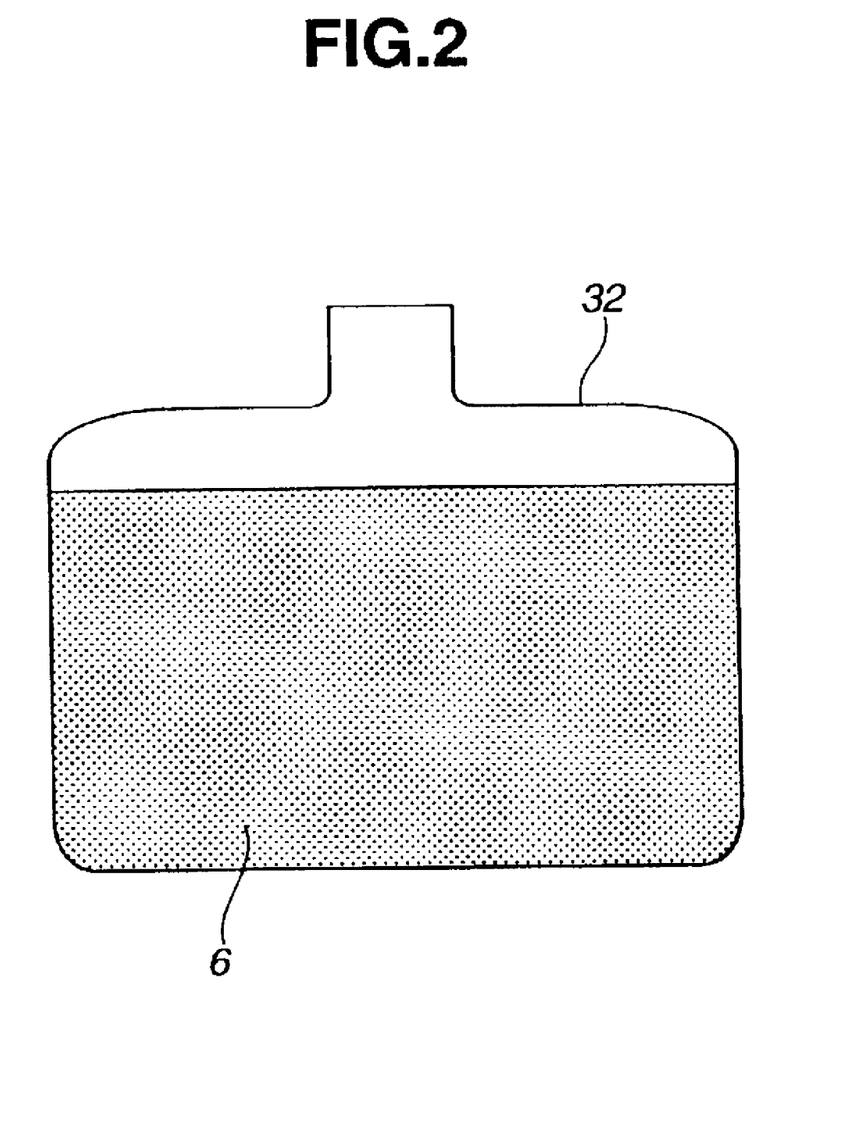
FIG. 2 is a schematic view of a container containing a radiation absorbing composition according to the present invention.

The gold (Au) is evaporated in a nitrogen atmosphere under a pressure of several hundreds Pa and collected. The evaporated substance collected, which is black or dark brown, is very fragile. This fragile substance is stirred within a mill to obtain separate and/or linked particles of gold (Au). The particles of gold (Au) is put into the SOG and stirred well to provide a radiation-absorbing SOG composition 6 of the SOG and the gold (Au) incorporated in the SOG in the form of separate and/or linked particles. FIG. 2 schematically illustrates the SOG composition 6 within a container 32. It is to be noted that the particles are not chemically bonded to the SOG.

Reference is made to FIGS. 3(A)–3(H) for illustrating a method of the present invention for fabricating a thermopile radiation detector as illustrated in FIG. 1 using the radiation absorbing SOG composition 6 illustrated in FIG. 2. Although a single thermocouple is illustrated in these Figures, it should be realized that a large number of thermocouples could be simultaneously fabricated.

Figure 3A:
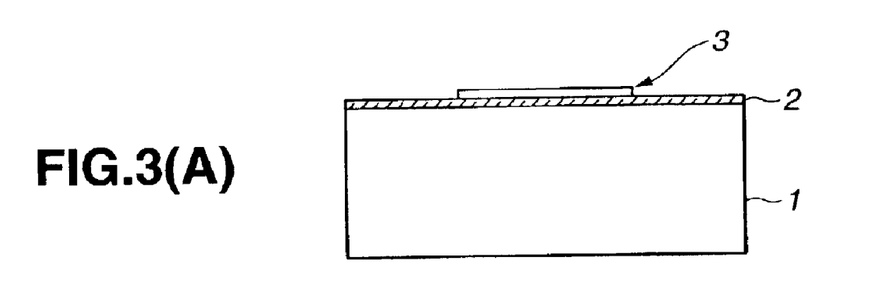
FIGS. 3(A)–3(H) are schematic cross sectional views, not to scale, that illustrate a method for fabricating the thermopile detector illustrated in FIG. 1 using the radiation absorbing composition illustrated in FIG. 2.

In FIG. 3(A), a semiconductor substrate 1 is provided. Using conventional semiconductor film forming processing, phosphosilicate glass (PSG) is deposited to form a film 2 on the substrate 1 such that the film 2 overlies a surface of the substrate 1. As this film becomes a membrane, it is herein called a membrane film. Using conventional thermopile detector fabricating processing, a thermocouple 3 of the thermopile radiation detector is formed on the membrane film 2.

Figure 3B:
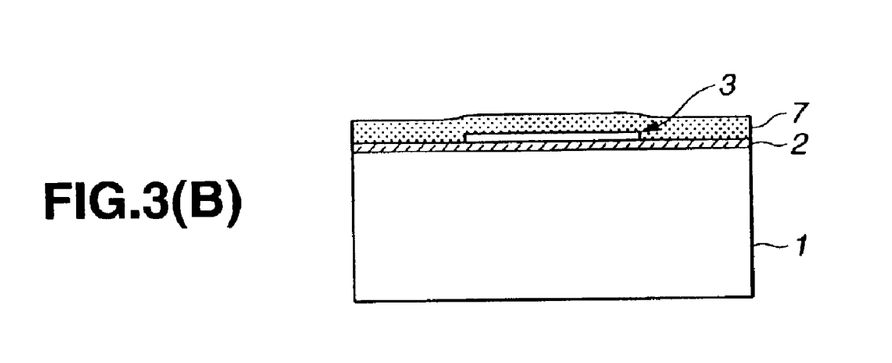
Figure 3C:
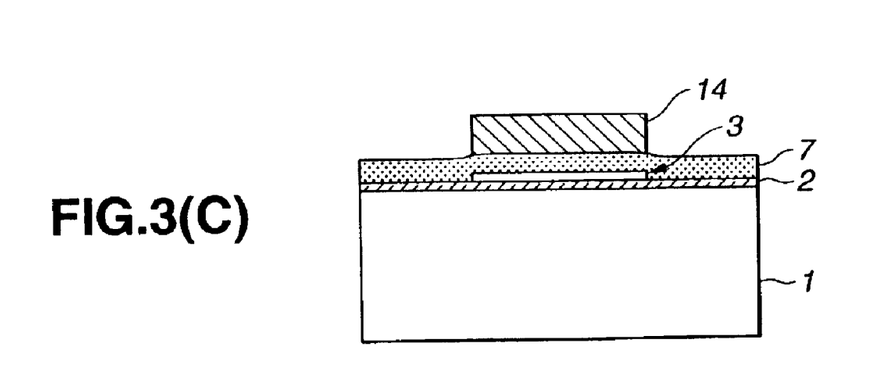
Figure 4:
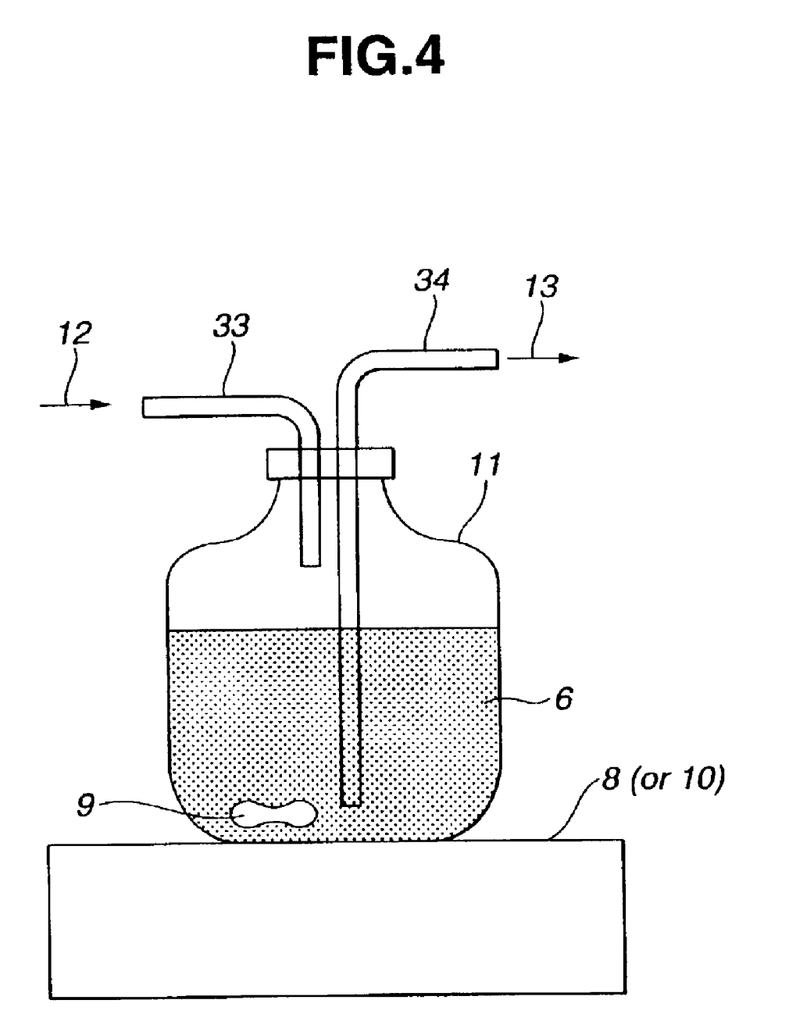
FIG. 4 is a schematic view that illustrates how to keep the radiation absorbing composition in a homogeneous state ready for a spin.

In FIG. 3(B), using conventional semiconductor processing, the SOG composition 6 is applied to form a film 7 of SOG composition such that the film 7 overlies the membrane film 2 and the thermocouple 3. The process includes a spin and thermal bake step or steps at temperature 200° C. Turning back to FIG. 2, the particles of gold (Au) of the SOG composition 6 soon settle because specific weight of gold (Au) is heavy. This is not suitable for the spin. FIG. 4 illustrates how to keep the SOG composition 6 in a homogeneous state ready for the spin. In FIG. 4, the SOG composition (liquid) 6 contained in a helium (He) gas atmosphere within a container 11. Helium gas, as indicated by an arrow 12, enters via a pipe 33 onto the top surface of a body of the SOG composition 6 within the container 11. Inserted deeply into the body of SOG composition 6 is an outlet pipe 34. Via this pipe 34, a required amount of the SOG composition 6 is supplied, as indicated by an arrow 13, to a spin coater. To keep the SOG composition 6 in a homogeneous state ready for the spin, an ultrasonic agitator 8 often called "homoginizer" or a stirring device 10 with a rotor 9 may be used. The container 6 is placed on the ultrasonic agitator 8 to continuously stir the SOG composition 6. Alternatively, the rotor 9 within the body of SOG composition 6 is rotated to continuously Stir the SOG composition 6.

Turning back to FIG. 3(C) for illustrating photolithography, a first resist 14 having a first pattern is formed such that it overlies a portion of a surface of the film 2 of SOG composition. Using the first resist 14 as a mask, the film 2 of the SOG is etched to a desired pattern using a conventional wet etching technique. The first resist 14 is stripped or removed to expose the portion of the film 7 of SOG composition overlaid thereby as illustrated in FIG. 3(D).

Figure 3D:
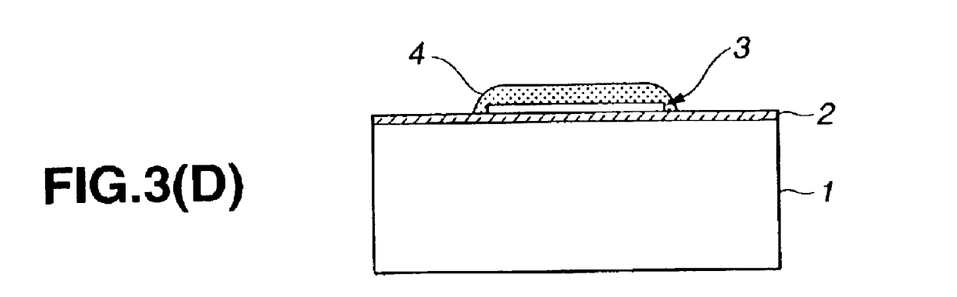

In FIG. 3(D), removing unnecessary portion, by etching, exposes the underlying membrane film 2. As SOG has a very high etch rate, the unnecessary portion of the film 7 of the SOG composition is removed without any damage to the underlying membrane film 2. The particles of gold (Au) flows out of the removed portion of the film 7 into the etchant liquid and settle on the substrate 1. To remove the settled particles of gold (Au), the substrate 1 is immersed into a mixture liquid containing iodine (I) or into aqua regia. In this manner, the desired shape of radiation-absorbing layer 4 is defined.

Figure 3E:
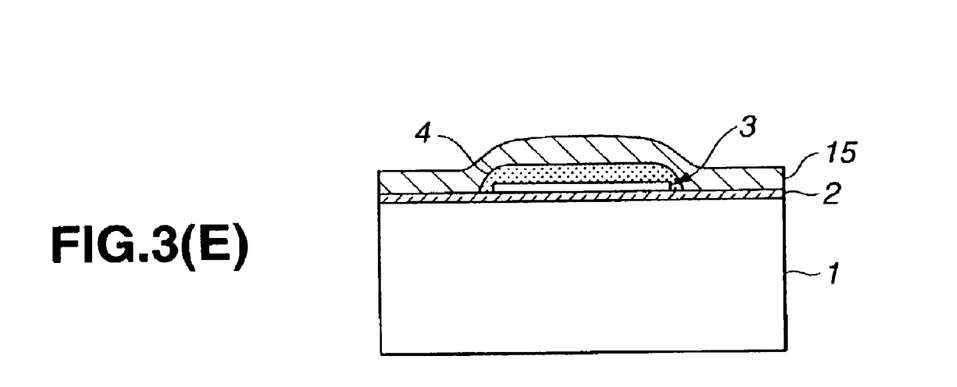

In FIG. 3(E), a film 15 of PSG is formed such that the film 15 overlies the exposed membrane film 2 and the exposed portion of the film of SOG composition, which is the radiation-absorbing layer 4. The thickness of the PSG film 15 is 1 μm.

Figure 3F:
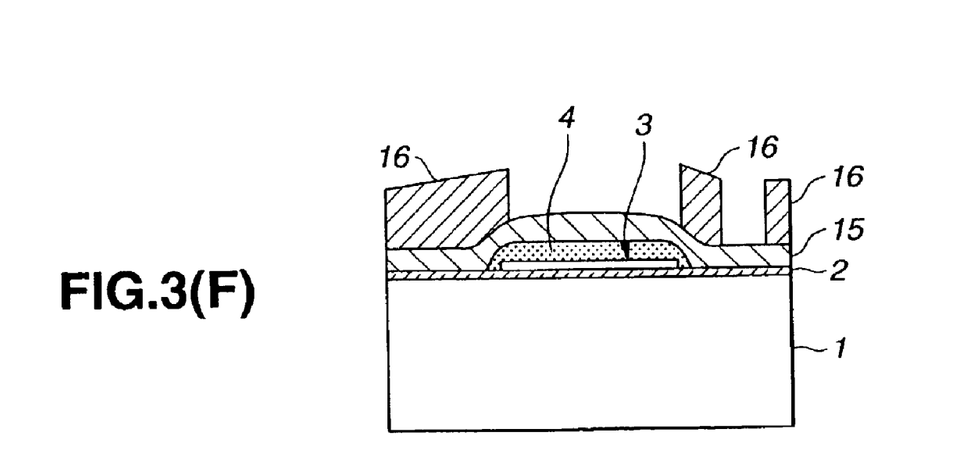

Reference is made to FIG. 3(F) illustrating photolithograph. In FIG. 3(F), a second resist 16 is formed. The second resist 16 has a second pattern such that it overlies the film 15 of PSG except a portion above the top of the radiation-absorbing layer 4, another portion used as a process aperture 17 (see FIG. 1), and other portions, not shown, for external connection.

Figure 3G:
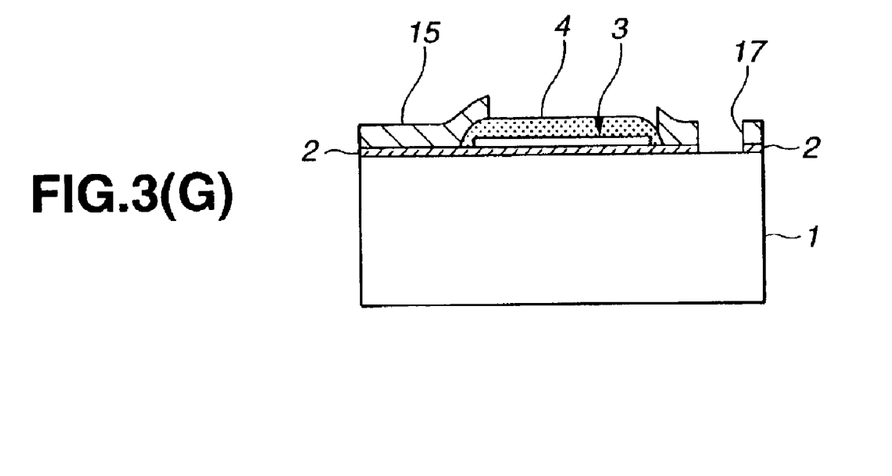

Referring also to FIG. 3(G), using the second resist 16 as a mask, the film 15 of PSG and the underlying membrane film 2 are etched. Etching in this manner removes unnecessary portions to expose the top surface of the radiation-absorbing layer 4, a portion of the substrate 1 for the process aperture 17 and other portions of the substrate 1 for external connection. In this etching, a so-called pad opening liquid is used. The pad opening liquid is a mixture of ammonia fluoride ($NH_4F$), glacial acetic acid, and water. As mentioned before, the SOG composition 6 that makes the radiation-absorbing layer 4 does not contain any phosphoric component, such as phosphoric anhydride ($P_2O_5$) Due to the lack of such phosphoric component, the pad opening liquid does not dissolve the radiation-absorbing layer 4.

Figure 3H:
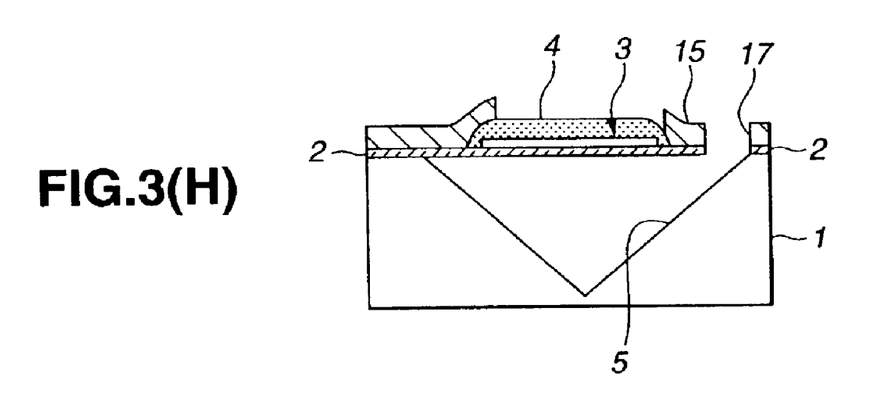

In FIG. 3(H), with the film 15 of PSG as a mask, heated hydrogen hydrate is used to etch the substrate 1 to remove a portion thereof to form a cavity 5 beneath the thermocouple 3 backed by the membrane film 2.

In the embodiment, gold (Au) is used as a particle material. The present invention is not limited to the use of gold. The appropriate particle material can be selected from a group consisting of metals including gold (Au), carbon (C), and silicon (Si). The present invention is not limited to the use of particles of a single material selected from the group. A plurality of particle materials may be used. The selection of the material or materials of the particles and size(s) thereof determines optical, chemical, and mechanical properties of the radiation-absorbing layer.

Turning back to FIG. 3(B), the step of forming the film 7 includes a sub-step of spinning the SOG composition 6 onto the membrane film 2 and the thermocouple 3. The portion or portions of the SOG composition spun out of the membrane film 2 will adhere to a so-called cup provided around a spin table. The particles of gold (Au) can be recycled. The recycle includes a sub-step of collecting the portion of the SOG material spun out of the membrane film 2 and the thermocouple 3 and adhered to the cup around the spin table. This sub-step is followed by another sub-step of removing, by diluted hydrofluoric (HF) acid, oxide of silicon of the collected portion(s), adhered to the cup, to obtain the particles of gold (Au) for recycle.

Recycling of such precious material is advantageous in bringing down the cost of fabrication of thermopile detectors.

However, the particles cannot be obtained for recycle if they are melted when in contact with the HF acid.

From the preceding description of the embodiment, it is now appreciated that the radiation-absorbing layer 4 is formed, using conventional semiconductor film patterning technique, by etching the film 7 of the SOG composition 6. Any special processing technique deviated from the conventional semiconductor processing is not required for this etching. This adds to yield of the fabrication of the thermopile detectors.

Figure 5:
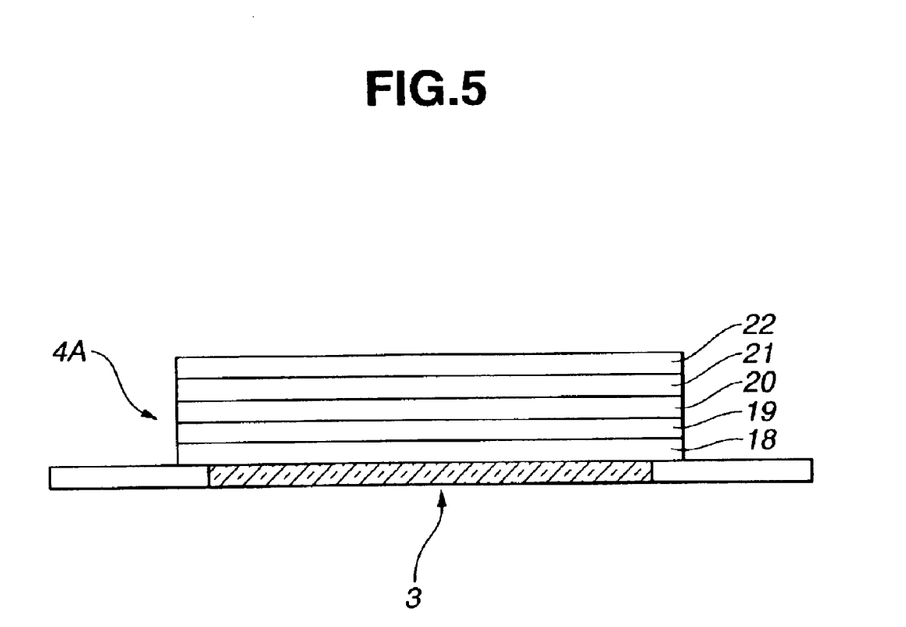
FIG. 5 is a schematic cross sectional view in simplified and exaggerated form of another radiation-absorbing layer according to the present invention applied to the top surface of a thermocouple.

Reference is now made to FIG. 5 illustrating another radiation-absorbing layer 4A according to the present invention applied to the top surface of a thermocouple 3. The radiation-absorbing layer 4A comprise a solid construction that is a stack of five films. The stack of films includes a first film 18 derived from a radiation-absorbing SOG composition, which includes the SOG (the same SOG used in the previously described embodiment) containing the particles of gold (Au) in a first amount in terms of a first percent by volume. It also includes a second film 19 derived from a radiation-absorbing SOG composition, which includes the SOG containing the particles of gold (Au) in a second amount in terms of a second percent by volume. It further includes a third film 20 derived from a radiation-absorbing SOG composition, which includes the SOG containing the particles of gold (Au) in a third amount in terms of a third percent by volume. It still further includes a fourth film 21 derived a radiation-absorbing SOG composition, which includes the SOG containing the particles of gold (Au) in a fourth amount in terms of a fourth percent by volume. It finally includes a fifth film 22 derived from a radiation-absorbing SOG composition, which includes the SOG containing the particles of gold (Au) in a fifth amount in terms of a fifth percent by volume. As shown in FIG. 5, the fifth film 22, fourth film 21, third film 20, second film 19 and first film 18 overlie one after another.

The second percent of the second film 19 is the highest among the first percent, second percent, third percent fourth percent and fifth percent.

With regard to the particles of gold (Au) in amount in a film, the more the amount of particles contained in the SOG, the higher the radiation-absorbing performance is. In this multi-layered construction, the second film 19 may be derived from a radiation-absorbing SOG composition, which includes the SOG containing the particles of gold (Au) in an amount in terms of a percent by volume that lies in a higher portion of a range from 10 to 90% by volume.

The first percent of the first film 18 is sufficiently lower than the second percent to maintain mechanical strength and electrical insulation.

In each SOG composition, the particles contained in the SOG are impurities. The mechanical strength of a film derived from the SOG composition depends on the amount of particles contained in the SOG. The less the amount of particles contained in the SOG is, the higher the mechanical strength of a film is. It is suggested by the inventors that there are cases where the mechanical strength of a film derived from a radiation-absorbing SOG composition drops if the amount of particles contained in the SOG is considerably large. It is also suggested by the inventors that there are cases where the electrical insulating property expected on a film derived from a radiation-absorbing SOG drops if the amount of the particles of gold (Au) is considerably large. To maintain mechanical strength and electrical insulation, the particles of gold (Au) in the first film 18 are sufficiently reduced in amount.

The third percent, the fourth percent and the fifth percent drop in this order. This gradation in percent is intended to increase absorptance of the incident radiation by reducing reflection of incident radiation at the surface. The fifth film 22 is a skin or protector layer of the radiation-absorbing layer 4A. Thus, the fifth percent may be zero. In other words, the fifth film 22 may be derived from the SOG containing no particles of gold (Au).

From the preceding description with reference to FIG. 5, it is appreciated, as an advantage, that the multi-layered construction of the radiation-absorbing layer 4A makes it easy to design the optical and mechanical property.

Figure 6:
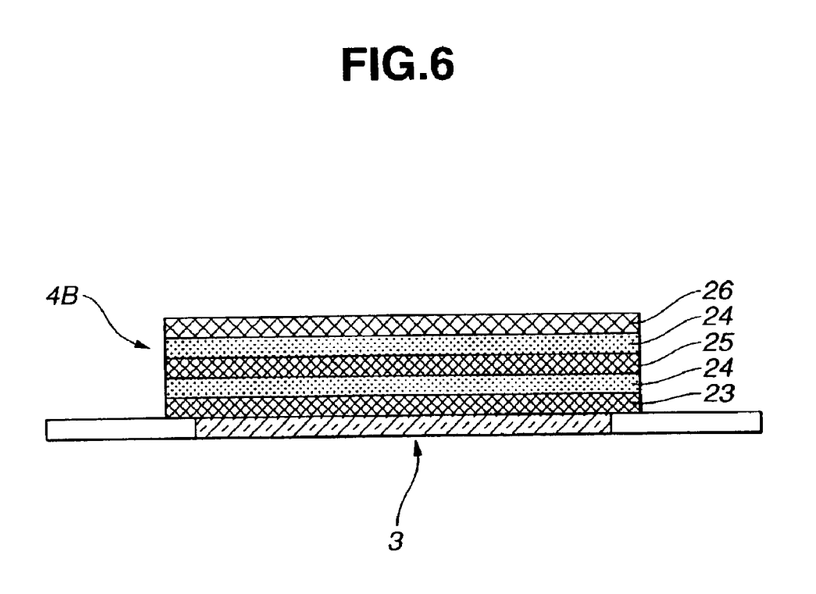
FIG. 6 is a schematic cross sectional view in simplified and exaggerated form of still another absorbing layer according to the present invention applied to the top surface of a thermocouple.

Reference is next made to FIG. 6 illustrating still another radiation-absorbing layer 4B according to the present invention applied to the top surface of a thermocouple 3. The radiation-absorbing layer 4B comprise a solid construction that is a stack of five films. The stack of films includes a first film 23 derived from a radiation-absorbing SOG composition, which includes the SOG (the same SOG used in the previously described embodiments) containing the particles of gold (Au) in a first amount in terms of a first percent 70% by volume. It also includes a second film 24 derived from a radiation-absorbing SOG composition, which includes the SOG containing the particles of silicon (Si) in a second amount in terms of a second percent 50% by volume. It further includes a third film 25 derived from a radiation-absorbing SOG composition, which includes the SOG containing the particles of gold (Au) in a third amount in terms of a third percent by volume. It still further includes a fourth film 24 derived the same radiation-absorbing SOG composition, which includes the SOG containing the particles of gold (Si) in the second amount in terms of second percent 50% by volume. It finally includes a fifth film 26 derived from a radiation-absorbing SOG composition, which includes the SOG containing the particles of gold (Au) in a fourth amount in terms of a fourth percent 10% by volume. As shown in FIG. 6, the fifth film 26, fourth film 24, third film 25, second film 24 and first film 23 overlie one after another.

The second and fourth films 24 derived from the SOG composition containing the particles of silicon (Si) are superior in mechanical strength due to firm engagement of the particles in the SOG matrix. With these films 24, the mechanical stress within the radiation-absorbing layer 4B can be controlled. To meet a need to accomplish increased absorption of incident rays having wavelengths within an infrared band, a radiation-absorbing SOG composition, which includes the SOG containing the particles of silicon (Si) doped with a dopant selected from a group consisting of phosphorus (P), boron (B) and arsenic (As), may be used in forming the second and fourth films 24.

The fifth film 26 is a skin or protector layer of the radiation-absorbing layer 4B. Thus, the fifth film 22 may be derived from the SOG containing no particles of gold (Au).

From the preceding description, it is appreciated, as an advantage, that the multi-layered construction shown in FIG. 6 makes it easy to provide a radiation-absorbing layer tuned to absorb incident radiation within a predetermined, e.g., infrared, band of wavelength and for reflecting incident radiation outside of the predetermined band of wavelength. This may be done by making appropriate selection, in the material and size, of the particles to be mixed with the SOG.

Figure 7:
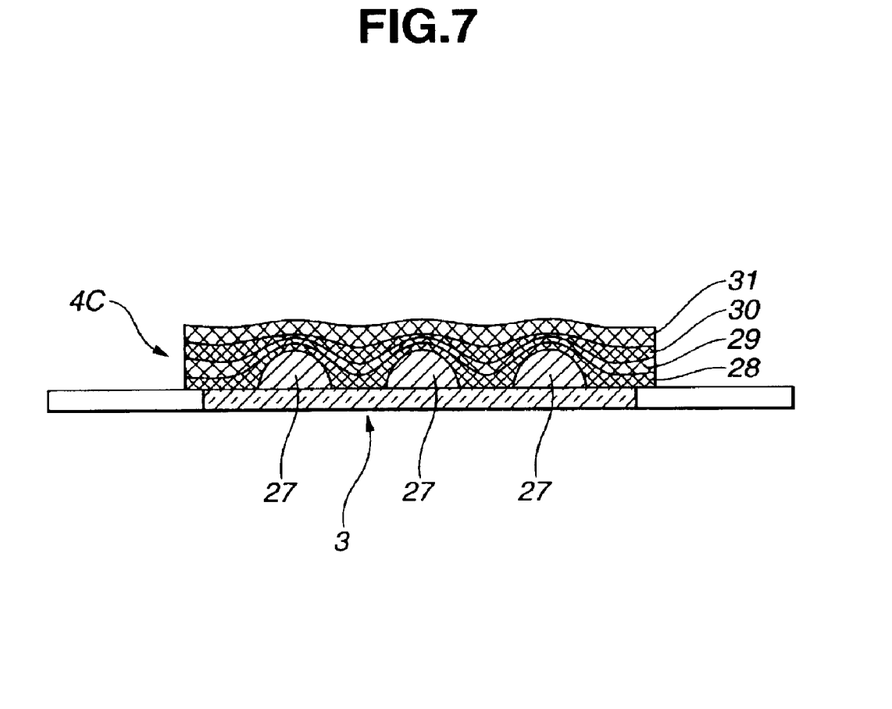
FIG. 7 is a schematic cross sectional view in simplified and exaggerated form of other radiation-absorbing layer according to the present invention applied to the top surface of a thermocouple.

Reference is finally made to FIG. 7 illustrating other radiation-absorbing layer 4C according to the present invention applied to the top surface of a thermocouple 3. The radiation-absorbing layer 4C is substantially the same as the previously described radiation-absorbing layers 4, 4A and 4B except underlying irregular topography (27) reflecting off incident radiation at different angles under the solid construction. The solid construction may be a single film as illustrated in FIG. 1 or a stack of films as illustrated in FIG. 5 or another stack of films as illustrated in FIG. 6. In FIG. 7, the solid construction, which is a stack of four films 28, 29, 30 and 31, overlies the irregular topography formed above the top surface of the thermocouple via a dielectric (electrically insulating) film, not shown.

The manner of forming the irregular topography will be explained.

First, a dielectric film is formed on the top surface of the thermocouple. Next, a film (1.5 $\mu$m thick) of aluminum (Al) oxide is formed on the dielectric film. Subsequently, using photolithograph and dry etching techniques, protuberances 27 are formed, which provide the irregular topography.

The material of the film is not limited to aluminum oxide. Silicon oxide doped with appropriate metal may be used. Using conventional semiconductor film forming techniques, a film (1.5 $\mu$m thick) of doped silicon oxide is formed on the dielectric film over the top surface of the thermocouple 3. Subsequently, using photolithograph and dry etching techniques, protuberances 27 are formed, which provide the irregular topography.

In the case where the aluminum oxide is used to make the protuberances 27, almost all of incident radiation is reflected off at different angles to be absorbed by the solid construction 28, 29, 30 and 31.

In the case where the doped silicon oxide is used to make the protuberances 27, a portion of incident radiation is absorbed by the protuberances 27, and the remainder is reflected off at different angles to be absorbed by the solid construction 28, 29, 30 and 31.

In the case where the aluminum oxide is used to form a film (1.5 $\mu$m thick), etching the film to leave a backing layer of about 0.5 $\mu$m thick in forming the protuberances 27 enhances the performance of irregular topography. The performance is increased because the backing layer reflects off incident radiation between the adjacent protuberances 27.

Subsequently after the formation of the protuberances 27, gaps or spaces between the protuberances are filled with the SOG composition(s) containing the particles or gold (Au) or silicon (Si). As shown in FIG. 7, the solid construction is deeper at gaps between the protuberances 27. With the same percentage by volume of particles, the absorptance of a film is proportional to the film thickness. Thus, the increased thickness at the gaps is beneficial to enhancement of performance. With the same thickness of a film, the absorptance of the film is proportional to the percentage by volume of particles. Thus, the percentage by volume of the particles may be lowered if the increased thickness of the gaps is advantageously used without lowering the level of performance. The reduction in percentage by volume of the particles leads to easy work in film processing steps.

From the preceding description of various implementations of the present invention, it is understood as an advantage that the radiation-absorbing layers are formed using conventional semiconductor processing techniques including etching.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-286477, filed Sep. 20, 2001, the disclosure of which is hereby incorporated by reference in its entirety.

What is claimed is:

1. In a thermopile radiation detector that is responsive to incident radiation having wavelengths of an infrared band, including:
   a semiconductor substrate;
   a membrane film formed on the semiconductor substrate;
   a thermocouple backed by the membrane film;
   the semiconductor substrate having a cavity formed beneath the thermocouple; and
   a radiation-absorbing layer overlying the thermocouple, the radiation-absorbing layer comprising:
   a solid construction of a mixture of an oxide of silicon and separate and/or linked particles of at least one material selected for absorbing incident radiation over the wavelengths of the infrared-band.

2. The radiation-absorbing layer as claimed in claim 1, wherein the material has a higher absorptance than the oxide of silicon does over the wavelengths of the infrared band; and wherein the solid construction has a higher absorptance than the oxide of silicon does over the wavelengths of the infrared band.

3. The radiation-absorbing layer as claimed in claim 2, wherein the solid construction incorporates separate and/or linked particles of a material that has a higher reflectance than the oxide of silicon does over the wavelengths of the infrared band.

4. The radiation-absorbing layer as claimed in claim 3, wherein the solid construction is derived from a spin-on-glass (SOG) containing the particles.

5. The radiation-absorbing layer as claimed in claim 1, wherein the solid construction is derived from a spin-on-glass (SOG) containing the particles.

6. The radiation-absorbing layer as claimed in claim 5, wherein the solid construction is a stack of a plurality of films including a first film derived from the SOG containing the particles in a first amount and a second film derived from the SOG containing the particles in a second amount that differs from the first amount.

7. The radiation-absorbing layer as claimed in claim 5, wherein the solid construction is a stack of a plurality of films including a first film derived from the SOG containing the particles of a first material in a first amount and a second film derived from the SOG containing the particles of a second material that differs from the first material in a second amount that differs from the first amount.

8. The radiation-absorbing layer as claimed in claim 5, wherein the SOG does not contain any phosphoric component.

9. The radiation-absorbing layer as claimed in claim 5, wherein the material is selected from a group consisting of metals including gold (Au), carbon (C) and silicon (Si).

10. The radiation-absorbing layer as claimed in claim 5, further comprising irregular topography reflecting off incident radiation at different angles, and wherein the solid construction overlies the irregular topography.

11. The radiation-absorbing layer as claimed in claim 10, wherein the irregular topography includes protuberances.

12. The radiation-absorbing layer as claimed in claim 11, wherein the solid construction is a stack of a plurality of films including first, second, third and fourth films each being derived from the SOG containing the particles.

13. The radiation-absorbing layer as claimed in claim 5, wherein the solid construction is a film derived from the SOG containing the particles of gold (Au) in an amount ranging from 10 to 90% by volume.

14. The radiation-absorbing layer as claimed in claim 5, wherein the solid construction is a stack of a plurality of films including a first film derived from the SOG containing the particles of gold (Au) in a first amount in terms of first percent by volume, a second film derived from the SOG containing the particles of gold (Au) in a second amount in terms of second percent by volume, a third film derived from the SOG containing the particles of gold (Au) in a third amount in terms of third percent by volume, a fourth film derived from the SOG containing the particles of gold (Au) in a fourth amount in terms of fourth percent by volume and a fifth film derived from the SOG containing the particles of gold (Au) in a fifth amount in terms of fifth percent by volume; and wherein the fifth film, fourth film, third film, second film and first film overlie one after another; and wherein the second percent is the highest among the first percent, second percent, third percent fourth percent and fifth percent; and wherein the first percent is sufficiently lower than the second percent to maintain mechanical strength and electrical insulation of the first film, and where the third percent, the fourth percent and the fifth percent drop in this order.

15. The radiation-absorbing layer as claimed in claim 5, wherein the solid construction is a stack of a plurality of films including a first film derived from the SOG containing the particles of gold (Au) in a first amount of 70% by volume, a second film derived from the SOG containing the particles of silicon (Si) in a second amount, a third film derived from the SOG containing the particles of gold (Au) in a third amount, a fourth film derived from the SOG containing the particles of silicon (Si) in a fourth amount and a fifth film derived from the SOG containing the particles of gold (Au) in a fifth amount of 10% by volume, and wherein the fifth film, fourth film, third film, second film and first film overlie one after another.

16. The radiation-absorbing layer as claimed in claim 5, wherein the oxide of silicon has a refractive index of about 1.3 and a reflectance of about 1.7% at a surface thereof assuming that there is no absorption of incident radiation.

17. The radiation-absorbing layer as claimed in claim 5, wherein the material is selected from one of gold (Au) and silicon (Si) doped with a dopant selected from a group consisting of phosphorus (P), boron (B) and arsenic (As).

18. A thermopile infrared radiation detector that is responsive to incident radiation having wavelengths of an infrared band, comprising:
   a semiconductor substrate;
   a membrane film formed on the semiconductor substrate;
   a thermocouple backed by the membrane film;
   the semiconductor substrate having a cavity formed beneath the thermocouple; and
   a radiation-absorbing layer overlying the thermocouple, the radiation-absorbing layer including:
   a solid construction of a mixture of an oxide of silicon and separate and/or linked particles of at least one material selected for absorbing incident radiation within the infrared band of wavelengths and for reflecting incident radiation outside of the infrared band of wavelengths.

19. A radiation-absorbing layer for a thermopile radiation detector that is responsive to incident radiation having wavelengths of interest, the radiation-absorbing layer comprising:

a solid construction of a mixture of an oxide of silicon and separate and/or linked particles of at least one material selected for absorbing incident radiation over the wavelengths of interest, the solid construction being derived from a spin-on-glass (SOG) containing the particles, wherein the solid construction is a stack of a plurality of films including a first film derived from the SOG containing the particles of gold (Au) in a first amount in terms of first percent by volume, a second film derived from the SOG containing the particles of gold (Au) in a second amount in terms of second percent by volume, a third film derived from the SOG containing the particles of gold (Au) in a third amount in terms of third percent by volume, a fourth film derived from the SOG containing the particles of gold (Au) in a fourth amount in terms of fourth percent by volume and a fifth film derived from the SOG containing the particles of gold (Au) in a fifth amount in terms of fifth percent by volume; and wherein the fifth film, fourth film, third film, second film and first film overlie one after another; and wherein the second percent is the highest among the first percent, second percent, third percent fourth percent and fifth percent; and wherein the first percent is sufficiently lower than the second percent to maintain mechanical strength and electrical insulation of the first film, and wherein the third percent, the fourth percent and the fifth percent drop in this order.

20. A radiation-absorbing layer for a thermopile radiation detector that is responsive to incident radiation having wavelengths of interest, the radiation-absorbing layer comprising:

a solid construction of a mixture of an oxide of silicon and separate and/or linked particles of at least one material selected for absorbing incident radiation over the wavelengths of interest, the solid construction being derived from a spin-on-glass (SOG) containing the particles, wherein the solid construction is a stack of a plurality of films including a first film derived from the SOG containing the particles of gold (Au) in a first amount of 70% by volume, a second film derived from the SOG containing the particles of silicon (Si) in a second amount, a third film derived from the SOG containing the particles of gold (Au) in a third amount, a fourth film derived from the SOG containing the particles of silicon (Si) in a fourth amount and a fifth film derived from the SOG containing the particles of gold (Au) in a fifth amount of 10% by volume, and wherein the fifth film, fourth film, third film, second film and first film overlie one after another.

21. A radiation-absorbing layer for a thermopile radiation detector that is responsive to incident radiation having wavelengths of interest, the radiation-absorbing layer comprising:

a solid construction of a mixture of an oxide of silicon and separate and/or linked particles of at least one material selected for absorbing incident radiation over the wavelengths of interest, the solid construction being derived from a spin-on-glass (SOG) containing the particles, and irregular topography reflecting off incident radiation at different angles, and wherein the solid construction overlies the irregular topography, and wherein the irregular topography includes protuberances, and wherein the solid construction is a stack of a plurality of films including first, second, third and fourth films, each being derived from the SOG containing the particles.

* * * * *